United States Patent [19]
Sakai

[11] Patent Number: 4,517,634
[45] Date of Patent: May 14, 1985

[54] POWER CONVERSION EQUIPMENT

[75] Inventor: Takami Sakai, Tokyo, Japan

[73] Assignee: Tokyo Shibaura Denki Kabushiki Kaisha, Kawasaki, Japan

[21] Appl. No.: 450,010

[22] Filed: Dec. 15, 1982

[30] Foreign Application Priority Data

Dec. 26, 1981 [JP] Japan .................. 56-213011

[51] Int. Cl.³ ............................. H02J 3/36
[52] U.S. Cl. .................... 363/35; 363/37; 363/51; 363/79
[58] Field of Search ............ 363/34, 35, 37, 51, 363/79

[56] References Cited

U.S. PATENT DOCUMENTS 3,470,442  9/1969  Ainsworth.

OTHER PUBLICATIONS

Patent Abstracts of Japan vol. 2, No. 61 9 May 1978 pp. 1700E78 & AP-A-53-24542.
International Conference on Large High Voltage Electric Systems 14-03 "Hokkaido-Honshu HVDC Link", T. Takenouchi; Aug. 27, 1980.

Primary Examiner—Peter S. Wong
Assistant Examiner—Anita M. Ault
Attorney, Agent, or Firm—Oblon, Fisher, Spivak, McClelland & Maier

[57] ABSTRACT

In the frequency control mode, a switch is ON. A power difference is fed back to an adder through a limiter and is compared with an output from a power setter. A difference signal from the adder is supplied to an adder to obtain a difference with detected power. By the feedback loop, the preset power is set to be substantially equal to the detected power. While the difference is greater than a predetermined value, an output from a level detector is at logic level "0". Even if a mode switch instruction is received in this state, an AND gate does not produce an output signal and the mode changing is not performed.

4 Claims, 3 Drawing Figures

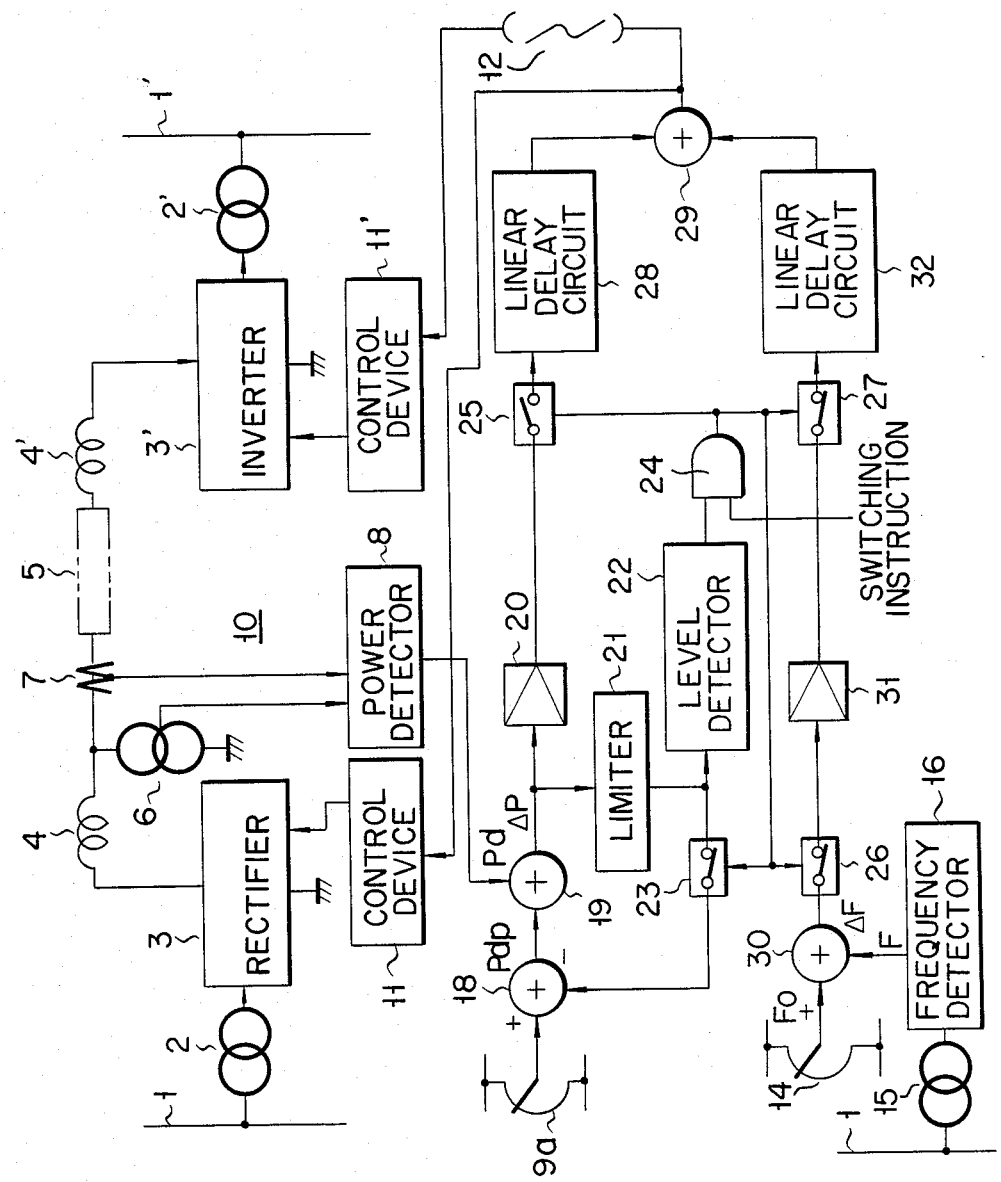
F I G. 3

POWER CONVERSION EQUIPMENT

BACKGROUND OF THE INVENTION

The present invention relates to power conversion equipment which has a frequency control device and a power control device and also has a switch device for switching between the two control devices.

FIG. 1 shows a block diagram of a system configuration of conventional power conversion equipment. Referring to FIG. 1, DC power transmission equipment has a DC system 10 connected between an AC system 1 at the sending terminal and another AC system 1' at the receiving terminal. A transformer 2 is connected to the AC system 1, and a rectifier 3 is connected to the transformer 2. A DC power from the rectifier 3 is supplied to one end of a DC transmission line 5 through a DC reactor 4. The other end of the DC transmission line 5 is connected to an inverter 3' through another DC reactor 4'. The inverter 3' converts the input DC power to an AC power.

A potential transformer 6 and a current transformer 7 are coupled between the DC reactor 4 and the DC transmission line 5. The voltage and current detected at the transformers 6 and 7 are supplied to a power detector 8. The detected power thus obtained is supplied to the control input end of a power control device 9. Preset power reference is also supplied from a power setter 9a to the power control device 9. Based on the detected power data and the preset power reference thus received, the power control device 9 produces a current reference. The current reference is supplied to a control device 11 at the sending terminal as well as to a control device 11' at the receiving terminal through a communication line 12. Each of the control devices 11 and 11' has a current control circuit, a voltage control circuit, an extinction angle control circuit and the like. Output signals from the control devices 11 and 11' are used for gate control of SCR's constituting the rectifier 3 and the inverter 3' to control the transmission power.

When the power conversion equipment as shown in FIG. 1 is operated in the frequency control mode, a frequency control device 13 as shown in FIG. 2 is used in place of the power control device 9. The frequency control device 13 receives a preset frequency signal from a frequency setter 14 as well as a detected frequency signal of the AC system 1 through a potential transformer 15 and a frequency detector 16. The frequency preset by the frequency setter 14 is fixed at, for example, 50 Hz, and a signal indicating the difference between the preset frequency and the detected frequency is obtained from the frequency control device 13. The difference signal is supplied to the control devices 11 and 11' shown in FIG. 1 through a current conversion circuit 17, so that the power frequency remains constant.

The power conversion equipment is generally operated in either the power control or frequency control mode. However, depending on the circumstances, both the power control device and the frequency control device may be installed and they may be selectively used as needed. Assume that power conversion equipment having a power control device and a frequency control device is operated in the frequency control mode and is transmitting power of 100 MW. Assume also that a switching instruction to the power control mode is produced from a remote control center or operating console, and that the preset power of the power setter 9a is 500 MW. Referring to FIG. 1, if the AC system 1 has a sufficient short-circuit capacity with reference to the DC conversion installation capacity, that is, if the AC system 1 is a strong AC system, the problems such as frequency variation may not be caused even if the transmitted power abruptly increases from 100 to 500 MW. However, in the case of a weak AC system 1 wherein the capacity ratio of the AC system 1 to the DC system 10 is below about 3, significant frequency variation will occur to cause a system failure. In order to prevent such problems, preset power from the power setter 9a must be changed to a value compatible with the current system state before the operation mode is changed from the frequency control mode to the power control mode. If a mode changeover device is constructed to be operated manually, a serious fault may occur by an erroneous manual operation. Furthermore, the manual operation does not meet a requirement of rapid changeover of the operation mode. Thus the mode changing should be done automatically.

SUMMARY OF THE INVENTION

It is an object of the present invention to provide power conversion equipment having a power control device and a frequency control device, and which allows easy switching between the power control mode and the frequency control mode without causing a clutter in the overall system.

In order to achieve the above object, there is provided in the present invention power conversion equipment, comprising power control means for controlling power of a power system in a power control mode; frequency control means for controlling frequencies of the power system in a frequency control mode; means for detecting power of the power system; a power setter for presetting power; means for calculating a difference between detected power and the preset power; mode changeover means for changing over between the power control means and the frequency control means; driving means for driving said mode changeover means to allow said mode changeover means to changeover from the frequency control mode to the power control mode only when the difference is below a predetermined value; and preset power control means for controlling the preset power so as to eliminate the difference in the frequency control mode.

BRIEF DESCRIPTION OF THE DRAWINGS

FIG. 3 is a system block diagram of power conversion equipment according to an embodiment of the present invention.

DETAILED DESCRIPTION OF THE PREFERRED EMBODIMENT

Figure 1:
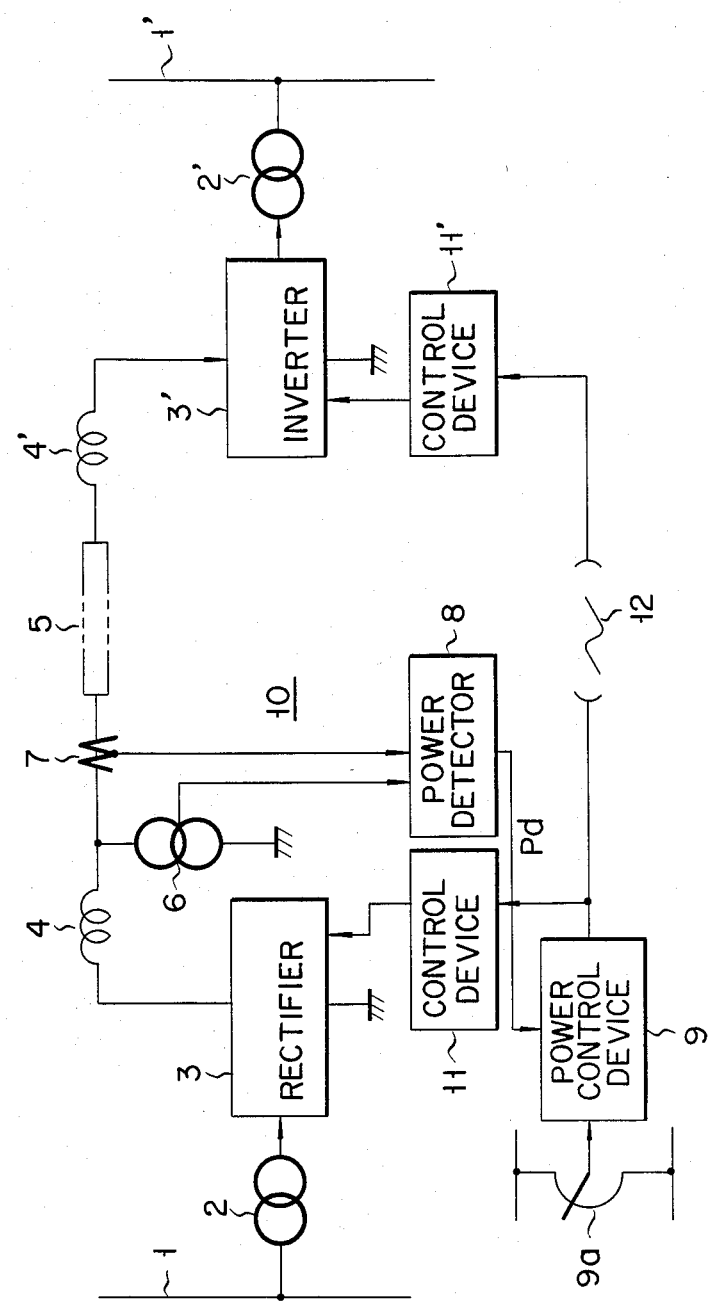
FIG. 1 is a system block diagram of conventional power conversion equipment having a power control device.
Figure 2:
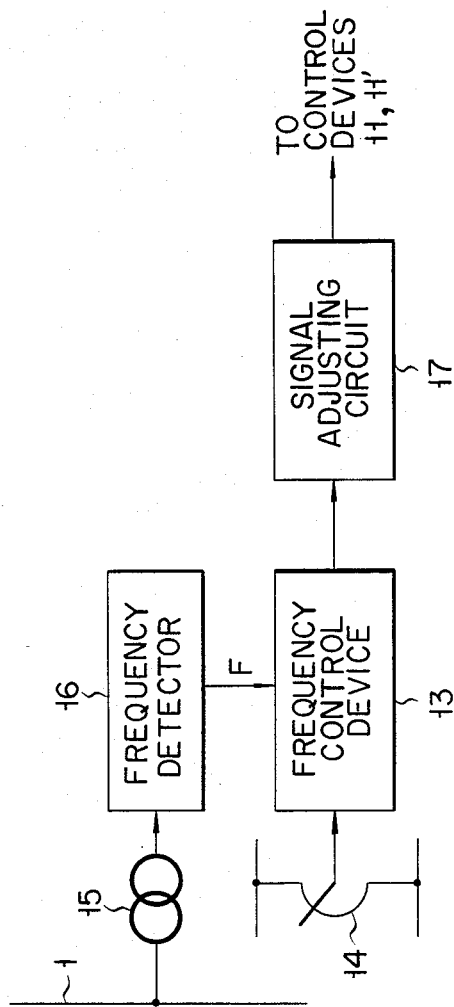
FIG. 2 is a block diagram of a frequency control device used in the conventional power conversion equipment shown in FIG. 1.

The preferred embodiment of the present invention will now be described in detail with reference to the accompanying drawings. Referring to FIG. 3, the same reference numerals as in FIG. 1 denote the same parts. In FIG. 3, a preset power from a power setter 9a is supplied to the positive input end of an adder 18. An output signal (preset power) Pdp from the adder 18 is supplied to the positive input end of an adder 19, to the negative input end of which an output signal or detected power Pd from a power detector 8 is supplied. A difference ΔP between the outputs Pdp and Pd is obtained from the adder 19 and is supplied to an amplifier 20 and a limiter 21 for power control. The limiter 21 is set so that it produces an output of about zero level at its output end only when the level of the signal of the difference ΔP is less than a predetermined level.

An output signal from the limiter 21 is supplied to a level detector 22 and is also fed back to the negative input end of the adder 18 through a switch 23. An output signal from the level detector 22 is supplied to one input end of an AND gate 24, to the other input end of which a switching instruction signal from an operator console or a remote control center is supplied. An output signal from the AND gate 24 is supplied to the drive input end of each of switches 23, 25, 26 and 27. One end of the switch 25 is connected to the output end of the amplifier 20, while the other end of the switch 25 is connected to one input end of an adder 29 through a linear delay circuit 28. The output end of the adder 29 is connected to a communication line 12.

A preset frequency F0 from a frequency setter 14 is supplied to the positive input end of an adder 30, to the negative input end of which a detected frequency F from a frequency detector 16 is supplied. A signal of difference ΔF between both frequency values is obtained from the adder 30, is supplied to an amplifier 31 for frequency control through the switch 26, and is amplified to a predetermined level. An output signal from the amplifier 31 is supplied to another linear delay circuit 32 through the switch 27. An output signal from the linear delay circuit 32 is supplied to the other input end of the adder 29 and is transmitted to the control devices 11 and 11'.

The mode of operation of the equipment according to one embodiment of the present invention and of the configuration as described above will now be described. Assume that the power conversion equipment is currently operating in the frequency control mode. In this state, the switches 23, 26 and 27 are ON, while the switch 25 is OFF. The difference ΔP is fed back to the one input end of the adder 18 through the limiter 21 and the switch 23. Assume that the detected power Pd is 50 MW, and the preset power is 250 MW. If the limit of the limiter 21 is 5 MW, the output signal from the limiter 21 is fed back to the adder 18 through the switch 23. As a result, the preset power Pdp decreases, and the difference ΔP also decreases. This feedback operation is performed automatically until the difference ΔP becomes less than the limit of the limiter 21.

Accordingly, even if the equipment is operating in the frequency control mode, the preset power Pdp is automatically controlled to coincide with the detected power Pd. When a switching instruction signal to switch from the frequency control mode to the power control mode is generated in this state, an output signal of logic level "1" is produced from the AND gate 24 since an output signal from the level detector 22 is at logic level "1". Thus, the switches 23, 26, and 27 are OFF, and the switch 25 is ON. An output signal from the linear delay circuit 28 smoothly increases, and since the switch 27 is OFF, the frequency control signal which has been supplied from the linear delay circuit 32 to the control devices 11 and 11' smoothly decreases. Therefore, the overall level of the control signals transmitted to the control devices 11 and 11' does not fluctuate much during mode switching. The mode can thus be switched to the power control mode without causing a clutter such as frequency variation of the system.

If the difference ΔP is above the limit of the limiter 21 when the instruction signal to switch from the frequency control mode to the power control mode is received, the output from the level detector 22 is at logic level "0". Then, switching to the power control mode is not performed and a clutter is prevented.

Although the preferred embodiment of the present invention has been described with reference to FIG. 3, the linear delay circuits 28 and 32 and the adder 29 may be omitted in accordance with the principle of the present invention.

When the linear delay circuits 28 and 32 and the adder 29 are eliminated from the FIG. 3 circuit, another signals such as either of the output signals from the switches 25 and 27 may be supplied to the control devices 11 and 11' in response to an operation mode instruction.

In summary, when power conversion equipment of the present invention is connected to a particularly weak AC system, it automatically changes the preset power so that the difference between preset power and detected power may be below a predetermined value. Therefore, switching from the frequency control mode to the power control mode may be easily performed without causing a clutter.

What is claimed is:

1. Power conversion equipment for converting electric power which is transmitted in a power system, comprising:
   means for detecting the electric power transmitted in said power system;
   a power setter for presetting a value of electric power of said power system;
   means for calculating a difference between the detected electric power and the preset value of electric power and for producing a corresponding output;
   mode changeover means for changing over an operation mode of said power system between a power control mode and a frequency control mode in response to said output of said difference calculating means;
   power control means for controlling the electric power of said power system when the operation mode of said power system is changed over to the power control mode;
   frequency control means for controlling a frequency of said power system when the operation mode of said power system is changed over to the frequency control mode;
   means for driving said mode changeover means such that said mode changeover means changes said operation from said frequency control mode to said power control mode only when the said output of said calculating means is below a predetermined value; and
   said power setter being operated to adjust the present value of electric power so as to eliminate said calculated difference in said frequency control mode.

2. Equipment according to claim 1, wherein said driving means comprises level detecting means connected to receive said output from said difference calculating means for producing an output signal of a selected logic level when the calculated difference in the frequency control mode is below the predetermined value; an AND gate which is turned ON in response to the output signal of the selected logic level from said level detecting means so as to produce an output signal of the selected logic level in accordance with a mode changing over instruction; and means for supplying the output signal of the selected logic level from said AND gate to said mode changeover means.

3. Equipment according to claim 1, wherein said difference calculating means comprises a first adder which has one polarity input end for receiving the preset value of electric power from said power setter; a second adder which has a positive input end for receiving an output signal from said first adder and the other polarity input end for receiving the detected power from said detecting means; a limiter for limiting a difference between the output signal of said first adder and the input to the other polarity input end of the second adder; and feedback means for feeding back an output signal from said limiter to the other polarity input end of said first adder.

4. Equipment according to claim 1, further comprising means for generating a power control signal in the power control mode and a frequency control signal in the frequency control mode, respectively, and means for using an output from said generating means for power conversion.

* * * * *